(12) United States Patent
Fischer et al.

(10) Patent No.: US 6,432,251 B1
(45) Date of Patent: Aug. 13, 2002

(54) METHOD OF ATTACHING PLASTIC PARTS TO A CONTAINER

(75) Inventors: Wolfgang Fischer; Bernd Kopp, both of Mainz; Inka Henze, Odenheim; Guido Krick, Bingen, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/494,680

(22) Filed: Jan. 31, 2000

(30) Foreign Application Priority Data

Jan. 29, 1999 (DE) .......................................... 199 03 479

(51) Int. Cl.[7] .............................................. B32B 31/12
(52) U.S. Cl. ................................. 156/272.6; 156/272.2; 156/273.3; 156/275.7
(58) Field of Search ........................... 156/272.2, 272.6, 156/273.3, 275.7, 293, 314; 222/475.1

(56) References Cited

U.S. PATENT DOCUMENTS 4,090,648 A * 5/1978 Roberts .................... 222/475.1
5,922,161 A * 7/1999 Wu et al. ................... 156/272.6

* cited by examiner

Primary Examiner—Michael W. Ball
Assistant Examiner—Jessica Rossi
(74) Attorney, Agent, or Firm—Michael J. Striker

(57) ABSTRACT

The method of attaching one or more plastic parts made from polypropylene to a glass container by means of an adhesive includes, prior to applying the adhesive over a portion of a surface of the one or more plastic parts in order to attach the plastic part or parts to the glass container, activating at least that portion of the surface, either by treating that portion of the surface with a low pressure plasma, preferably generated in a natural gas/air mixture at from 10 to 500 Pa, or by treating that portion of the surface with a flame from a gas burner. The one or more glass parts include a plastic handle and/or plastic lip member with a circumferential groove engageable with the upper edge of the glass container, especially a coffee container.

6 Claims, 2 Drawing Sheets

METHOD OF ATTACHING PLASTIC PARTS TO A CONTAINER

BACKGROUND OF THE INVENTION

1. Field of the Invention

The present invention relates to a method of attaching plastic parts to a glass container and, more particularly, to a method of attaching polypropylene plastic parts, such as a handle and/or a plastic lip member for enclosing an upper edge of the glass container, with or without a spout, to a glass container by means of an adhesive or glue. It also relates to the container or vessel, which is the product of this method.

2. Prior Art

Glass vessels or containers, which are used as serving vessel and hanging containers for cold and hot drinks (for example coffee) or also for their preparation, are provided with a plastic edge piece or lip member to prevent breakage due to impacts on the container neck. For holding the container, especially when it is filled with a hot drink, a plastic handle is usually provided, which is either a separate part or is integrated into the plastic edge piece.

Acrylic nitrile-butadiene-styrene copolymer (designated ABS in the following) is an economical and easily glued plastic material. Several ABS variants are permissible according to the U.S. Food and Drug Administration and the German Health Department, so that the plastic edge member that comes into direct contact with the drink can also be made from ABS. The permissible ABS variants of course can withstand the temperatures in the standard household washing machine, but may however deform and discolor during cleaning in industrial washing machines.

Polypropylene is preferred to ABS for economic and health reasons. Furthermore polypropylene fulfills the requirements of shape and color stability at temperatures of 90° C. and higher.

Usually the bonding strength at application temperatures of 90° C. and higher has been so small that adhesion loss or rupture occurs, i.e. a crack or fissure is formed between the adhesive and the plastic part. Temperatures of 90° C. and higher occur in industrial washing machines used in professional applications.

Separate handles are only glued. Plastic edge pieces, among other things, have a circumferential groove in their lower edge, when they are made from polypropylene, by means of which they are clamped onto the glass container edge, and are also attached by adhesive, which is injected into the groove. First, the adhesive acts to fill the open space between the glass container edge and the groove in the plastic edge piece. The force transmission is primarily effected mechanically. Usually a silicone adhesive ingredient and an additionally used adhesion-promoting agent (primer) provide a sufficiently strong bond with ABS between the plastic part and the glass container. When the adhesive mass is overstressed a cohesive rupture occurs, whereby a tear is formed through the adhesive mass.

The adhesive in the plastic edge piece also performs a sealing function. It prevents liquid from flowing out of the container between the plastic edge member and the edge of the glass container. A sealing ring can also be used for this purpose. Usually in this case two separate plastic parts, which are fastened together, are used as the plastic edge piece. This is more expensive and involves more effort than using a one-piece plastic edge part.

A container is described in EP 0 413 196 B1, in which the handle is not integrated with the plastic edge piece, but both parts are separate. The handle is attached to the outside of the container, but it positively locks or form-locks with the plastic edge piece. This positive locking connection works against including a spout in the plastic edge piece. The plastic edge piece and the handle must have a complex shape, which results in an expensive and difficult manufacture and assembly. No statements are made regarding the resistance of the adhesive to high usage temperature.

The problem with gluing polypropylene is that polypropylene is nonpolar and is poorly wet by agents which are more polar than polypropylene, e.g. good adhesives for glass. Several possible methods for treating surfaces of nonpolar materials known to impart polar properties to them are described in Proceedings of the 11th Professional Conference, New Surfaces for Plastic Materials, Treatment and Coating, Regensburg, Sep. 23/24 1998. Plasma polymerization (loc. cit., p. 179) and gas flaming (loc. cit., p. 210) were mentioned. The plasma polymerization method comprises deposition of a polymer layer with polar functional groups on a substrate by means of a plasma in a pre-selected atmosphere. In gas flaming first the surface is oxidized and then polarized by means of ions and electrons in the flame.

The theme of the article "Adhesives of Plastic Material", which appeared in the Journal, Plastics Advisor, Aug. 7, 1982, is that difficult-to-glue plastic materials must be pre-treated. The pre-treatments recommended for polypropylene are of a chemical nature, e.g. by steeping in chromosulfuric acid; of a thermal nature, e.g. by gas flaming, or of an electrical nature, e.g. by corona discharge. These methods are for bonding plastic materials with each other. The bonding of plastic to glass is not mentioned.

The article "Bonding of Plastics after Treatment in a Low Pressure Plasma", appearing in the Plastics Journal 73, 3 (1983), discloses that the adhesion of polypropylene increases after pre-treatment in a low pressure plasma in the case of a steel-plastic example. This effect lasts for a few to several days. Oxygen is one of the gases suggested for the low pressure plasma activation. However this article also does not mentioned any examples of bonding plastic to glass.

In the cited prior art there is no suggestion that one could improve the bonding strength of adhesive compositions for application temperatures of 90° C. and higher.

SUMMARY OF THE INVENTION

It is an object of the present invention to provide a method for bonding or attaching polypropylene to glass by means of an adhesive or glue in order to provide sufficient bonding strength, even at application temperatures of 90° C. and higher.

According to the invention this object is attained by two methods for attaching polypropylene plastic parts to a glass container, for example a handle or a plastic edge piece or lip member enclosing the upper edge of the glass container, with or without spout, by means of an adhesive or glue, in which the plastic parts are each surface-activated, at least on surface portions where the adhesive or glue is applied, before the adhesive or glue is applied. The surface activation is performed, either in a low pressure plasma or by flaming.

The surface is made more polar prior to applying the glue or adhesive by the surface activation. Thus the wettability of the surface for the adhesive material is increased and thus also the bonding strength between the polypropylene and the glue. It has been shown that this increased bonding strength also persists at higher temperatures, so that sudden detachment of the plastic parts from the glass container no longer occurs during use at higher temperatures.

The first method according to the invention is based on the surface activation in a low pressure plasma. The low pressure plasma is produced by activation of an electric field of sufficient strength in a gas at low pressure. The ionization occurring under the influence of the electric field leads furthermore to cleavage of electrons and positively charged ions from electrically neutral gas atoms. Since the number of positive and negative charge carriers in the plasma is the same, it is electrically neutral from the outside, but still has an electrical conductivity. The surface activation is caused by impact of plasma particles on the atoms or molecules of the parts to be treated in the vicinity of the surface.

It has proven advantageous to work at pressures between 10 Pa and 500 Pa for surface activation of polypropylene for bonding to glass.

Chemical changes occur on the surface according to the composition of the process gas. Plasmas produced in oxygen or oxygen-containing gas mixtures produce cleaning and also activating effects. In the simplest case air can be used. Organic coatings are converted to water and carbon dioxide in appropriately conducted processes and subsequently oxygen-containing polar functional groups are fixed to chains on the plastic surfaces thus cleaned. Important functional groups for wetting properties include carbonyl, carboxyl, hydroxy and, if necessary, peroxide groups.

To increase the bonding strength the handle or plastic part to be activated in the low pressure plasma is also preferably provided with a chemical adhesion promoting layer (primer) prior to application of the adhesive. The application of a chemical adhesion promoting agent also has a cleaning effect on the surface, on which the adhesive is to be applied, for removal of dust, fat and other foreign substances.

After activation in the low pressure plasma it is possible to store the polypropylene parts for a couple of days to-weeks, prior to further processing, without loosing the ability to bond with the adhesive or glue to be applied later. This is of great advantage for process engineering, since the place of activation and the place of further processing can be separated at some distance from each other and high investment costs for construction of an assembly line or processing station with an integrated plasma reactor can be avoided.

In large-scale activation of polypropylene surfaces one must consider that the wettability of the edge or lip member of the container over which the liquid is poured is increased so much that the liquid runs over the entire edge or lip member surface when it is poured out of the container. This behavior can be easily prevented by targeted protection for portions of the surface that are not to be surface-activated.

The second method according to the invention is based on surface activation by flaming or scorching. Polar molecules are produced on the originally nonpolar surface of a polypropylene plastic part by oxidation and introduction of electrons and ions, which provide the adhesive molecules with binding possibilities.

With this type of surface activation it is possible to only activate the places at which glue or adhesive is to be applied. In the case of the plastic edge piece or lip member it is possible for example to activate only one side and bottom interior surface of the circumferential groove. This would maintain the poor wettability for the pouring of the liquid over the outer surface of the plastic lip member.

A gas burner is preferably used for the flaming. Since scarcely any special treatment tools are necessary, this preferred embodiment of the method is extraordinarily economical and simple.

The resulting properties of the activated polypropylene surface depend decisively on the flame characteristics, which means the temperature, ion distribution and parameters of the active region. The active region is the oxidizing region, which is visible as a dark blue flame envelope. The bright blue flame cone is strongly reducing and thus not useful for the surface activation. In the oxidizing region temperatures and ion densities are distributed differently. Moreover the resulting properties depend on the intensity of the reciprocal action on the surface, which is determined by the distance of the burner to the plastic surface and acting time.

Optimum flame properties for the surface activation of polypropylene are obtained with a gas-air mixture of 8 to 12 parts by volume air and 1 part by volume natural gas. Air and natural gas are also available at minimal expense.

The distance of the burner from the plastic surface of 70 to 100 mm has been determined to be advantageous for flaming plastic edge pieces or lip members and handles made of polypropylene. Thus it is guaranteed that the surface always comes into contact with the flame regions having the beneficial temperatures, ion densities and oxidizing action.

When all the statistical parameters are optimized, the preferred acting time must be determined as well as the possibilities for controlling it. The burner and the plastic part may be moved relative to each other in order to be able to control the acting time. Preferably the burner is fixed and the plastic part to be treated is moved.

It has proven to be suitable that the relative speed with which the best activation results are attained is in a range between 300 mm/s and 600 mm/s. When the relative speed is in this range it is possible to avoid overheating or melting the polypropylene and also to shorten the acting time necessary to activate the surface.

In order to active certain surfaces it has astonishingly be shown that they may be precisely activated when the flame is positioned above the surface to be activated and for example the flame is directed at the plastic edge part from above into the groove.

Furthermore the accuracy may be definitely increased and limited to certain surfaces during flaming, when a gas burner with a circular nozzle is used so that a long flame with a circular horizontal cross-section that comes to a point or tip is employed.

When a plastic edge piece which is attached to the upper edge of the glass container by means of the circumferential groove, the degree of activation of certain regions can be controlled so that either the gas burner is oriented at an angle of approximately 0° relative to a vertical direction from the bottom surface of the groove and both sides are flamed at the same time or the gas burner is gently inclined (until about 15°) to the vertical and the predominantly the outer side and the bottom surface of the groove are flamed, so that they are more strongly treated than the interior side of the circumferential groove and thus provide a stronger bonding strength than the interior side.

It is a great advantage that since no-expensive apparatus is required to perform the method, the flaming can be integrated without additional expensive in the manufacturing process and thus the plastic parts can be further processed immediately after flaming, e.g. can be provided with a chemical adhesion promoting agent (primer). The investment cost for conversion of purely glued plastic handles and plastic lip members made from polypropylene to flamed handles and lip members is thus minimal.

A final but significant advantage of flaming is that sufficient adhesion can be achieved also for application temperatures of 90° C. and higher. Without the method of the invention one must fall back on the chemical adhesion promoting agents (primers). Since currently chemical adhesion promoting agents must be applied by hand, the invention provides a large saving of time and expense. Moreover large amounts of organic solvent must be used for the chemical adhesion promoting substance, which are unhealthy for workers and the environment.

The subject matter of the invention also includes a container made from glass and plastic parts, such as a plastic handle and/or plastic edge piece or lip member fastened over the upper edge of the container, with or without a spout, which are made from polypropylene.

BRIEF DESCRIPTION OF THE DRAWING

The objects, features and advantages of the invention will now be illustrated in more detail with the aid of the following description of the preferred embodiments, with reference to the accompanying figures in which.

BRIEF DESCRIPTION OF THE PREFERRED EMBODIMENT

Figure 1:
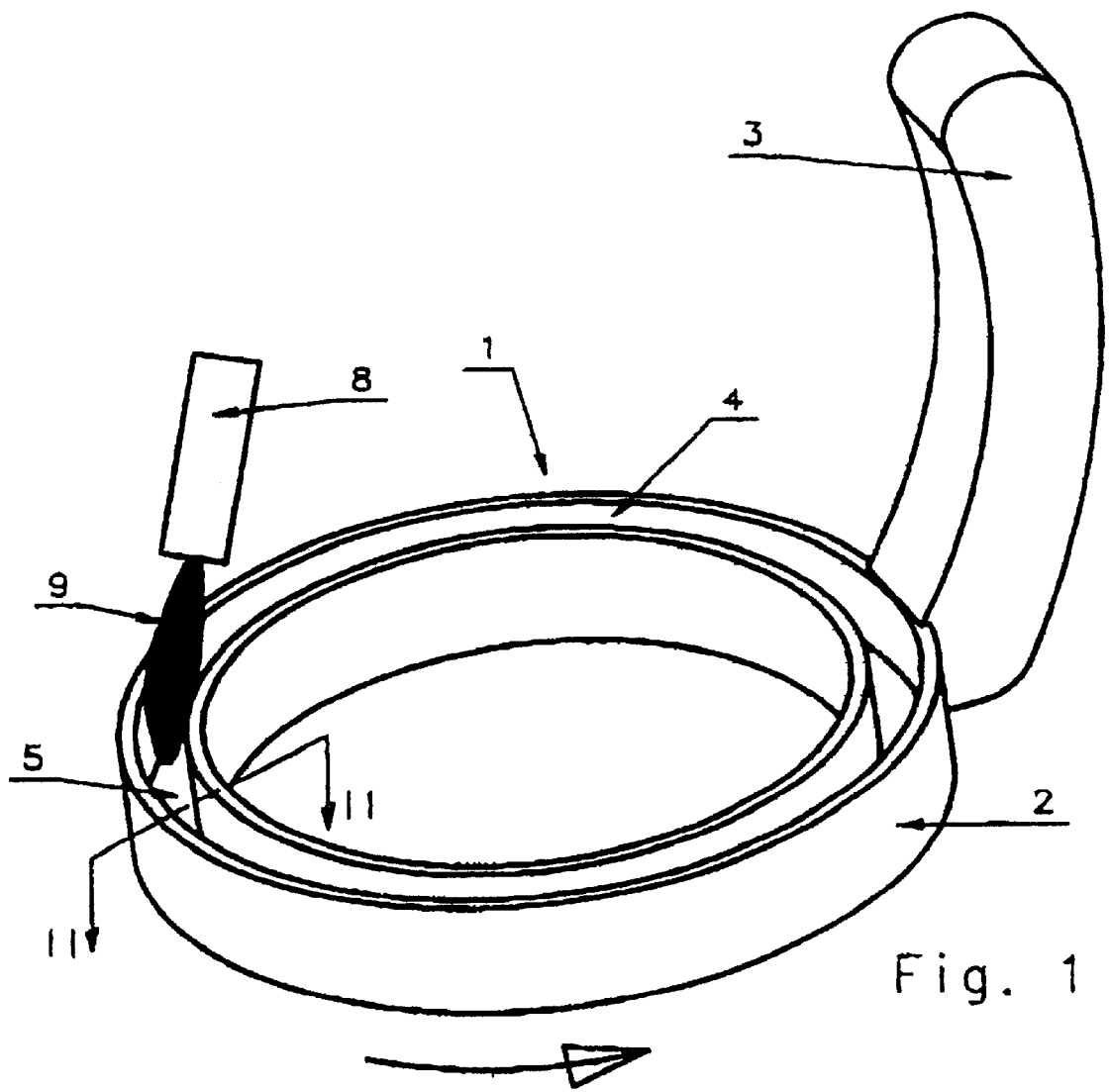
FIG. 1 is a perspective view of a plastic edge member with a groove during flaming.

FIG. 1 shows a plastic part during the flaming. The plastic part 1 comprises a plastic edge piece or lip member 2 with an integrated handle 3 and a circumferential groove 4, which is dimensioned so that it exactly fits around the upper edge of a glass container. Adhesive is introduced into this groove 4. Before that the groove 4 must be surface activated, which takes place by flaming by means of a gas burner 8 and its flame 9. During the flaming the gas burner 8 remains in a predetermined position, for example in this embodiment above the plastic edge piece 2. The plastic edge piece 2 in contrast is rotated under the gas burner 8 so that the flame 9 travels along the interior to the groove 4 and treats it with flame 9. The gas burner 8 is selected so that the flame 9 has a circular or round horizontal cross-section, so that only the groove 4, the desired target, is treated with the flame 9.

Figure 2:
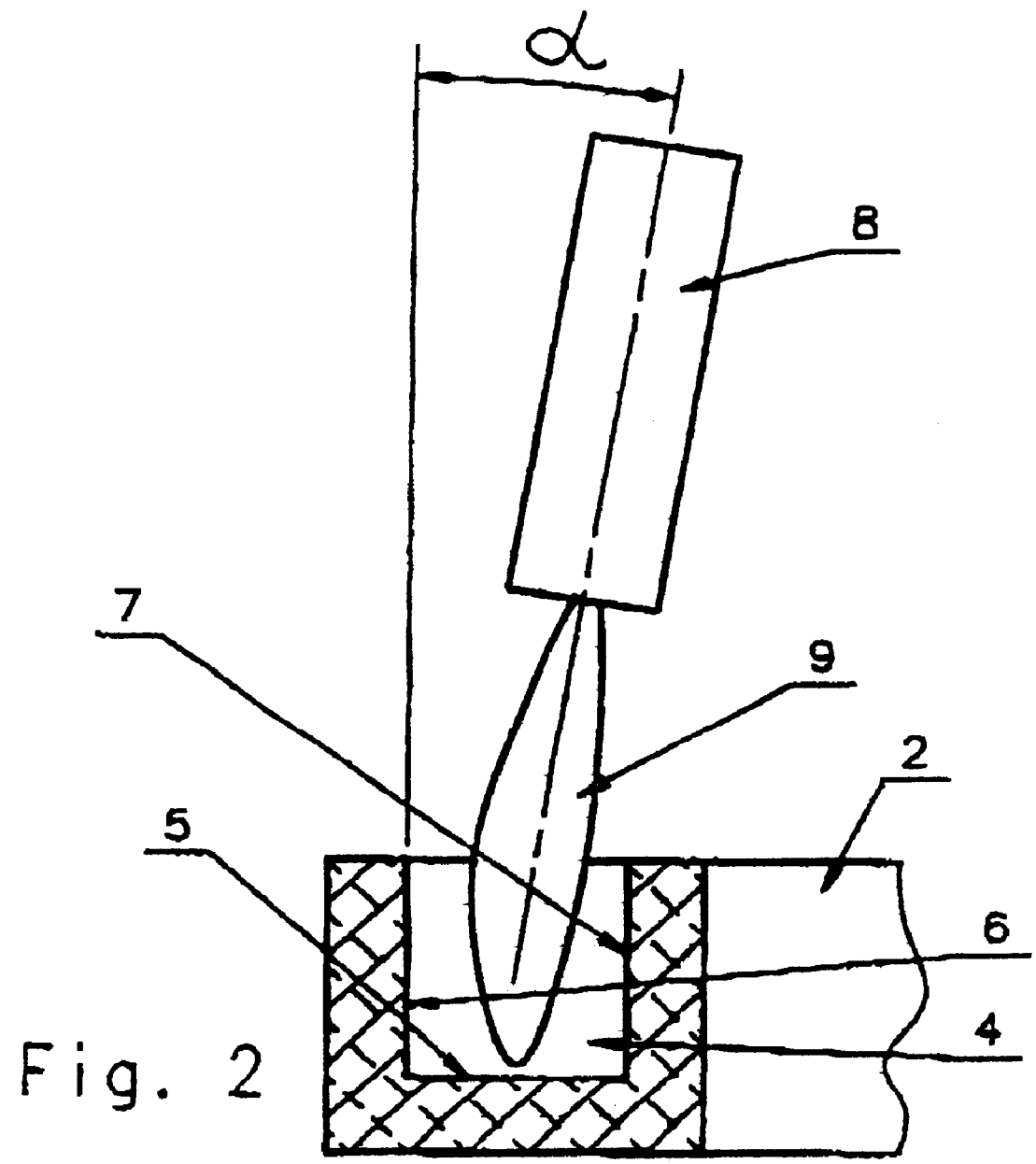
FIG. 2 is a diagrammatic cross-sectional view through the groove and the gas burner flame taken along the section line II—II in FIG. 1.

In FIG. 2 a cross-section through the groove 4 and the gas burner 8 as well as the flame 9 taken along the section II—II is shown in order to illustrate the position of the gas burner 8 and the flame 9 relative to the scorched or flamed out groove 4. In this special embodiment above all the outside internal surface 6 and the bottom internal surface 5 of the groove should be surface activated, since the forces, which act against the bond during lifting and carrying of the container, first act on them instead of the inside internal surface 7. For this purpose the flame 9 is not held vertically, or perpendicular, to the bottom surface 5, but is directed toward- the bottom surface 5 at an angle $\alpha$ to the vertical.

The disclosure in German Patent Application 199 03 479.6 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of attaching plastic parts to a container, especially a glass container, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of attaching at least one plastic part to a glass container by means of an adhesive, wherein each of said at least one plastic part is made of polypropylene, said method comprising the steps of:
   a) generating a low pressure plasma;
   b) activating at least one surface of said at least one plastic part by treating said at least one surface with the low pressure plasma, whereby another surface of said at least one plastic part that is not to be surface-activated is provided with a targeted protection;
   c) after the activating, applying an adhesive to at least one activated surface of said at least one plastic part, said at least one activated surface being formed during the activating of the at least one surface with the low pressure plasma; and
   d) after the applying of step c), bringing the glass container together with the at least one plastic part so that the adhesive on the at least one activated surface contacts the glass container;
   whereby each of said at least one plastic part is fastened to said glass container by means of the adhesive.

2. The method as defined in claim 1, wherein said low pressure plasma is produced in a gas at a gas pressure of 10 to 500 Pa during the generating.

3. The method as defined in claim 1, wherein said low pressure plasma is produced in oxygen or an oxygen-containing gas mixture during the generating.

4. The method as defined in claim 1, further comprising applying a chemical adhesion promoting agent to said at least one activated surface after the activating but prior to the applying of the adhesive.

5. The method as defined in claim 1, further comprising waiting for a period of a couple of days to weeks between said activating of said portion of said surface and said applying of said adhesive.

6. The method as defined in claim 1, wherein said at least one plastic part consists of a plastic handle and a plastic lip member with or without a spout and said plastic handle and said plastic lip member are each separate plastic parts that consist of said polypropylene.

* * * * *